US008020162B2

(12) United States Patent
Benke et al.

(10) Patent No.: US 8,020,162 B2
(45) Date of Patent: Sep. 13, 2011

(54) EMPLOYING A RESOURCE BROKER IN MANAGING WORKLOADS OF A PEER-TO-PEER COMPUTING ENVIRONMENT

(75) Inventors: Oliver Benke, Leinfelden-Echterdingen (DE); Boas S. Betzler, Magstadt (DE); Thomas J. Lumpp, Reutlingen (DE); Eberhard Pasch, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 867 days.

(21) Appl. No.: 10/199,544

(22) Filed: Jul. 19, 2002

(65) Prior Publication Data

US 2004/0015977 A1     Jan. 22, 2004

(51) Int. Cl.
G06F 9/46 (2006.01)
G06F 15/173 (2006.01)
G06Q 10/00 (2006.01)
(52) U.S. Cl. ........ 718/104; 718/105; 709/226; 705/7.26
(58) Field of Classification Search .................. 709/203, 709/202, 219, 226; 718/106, 100, 104–105; 705/8
See application file for complete search history.

(56) References Cited

U.S. PATENT DOCUMENTS

| | | | | |
|---|---|---|---|---|
| 5,329,619 A | 7/1994 | Page et al. | ...................... | 395/200 |
| 5,341,477 A | 8/1994 | Pitkin et al. | ................... | 395/200 |
| 5,761,507 A | 6/1998 | Govett | .......................... | 395/684 |
| 5,826,244 A | 10/1998 | Huberman | ...................... | 705/37 |
| 5,925,102 A * | 7/1999 | Eilert et al. | .................... | 709/226 |
| 5,926,102 A * | 7/1999 | Chun et al. | ...................... | 340/5.3 |
| 5,926,798 A | 7/1999 | Carter | .............................. | 705/26 |
| 5,953,229 A | 9/1999 | Clark et al. | .............. | 364/468.06 |
| 5,960,404 A * | 9/1999 | Chaar et al. | ........................ | 705/8 |
| 6,026,404 A | 2/2000 | Adunuthula et al. | ........... | 707/10 |
| 6,032,172 A * | 2/2000 | Kutcher | ........................ | 718/102 |

(Continued)

FOREIGN PATENT DOCUMENTS

JP         3116262 A      8/1990

(Continued)

OTHER PUBLICATIONS

"Exploitation of business opportunities: the role of the enterprise broker", Camarinha,Matos LM, Afsarmanesh H; Rabelo RJ; E-Business and Virtual Enterprises. Managing Business-to-Business Cooperation. IFIP TC5/WG5.3 Second IFIP Working Conference on Infrastructures for Virtual Organizations: Managing Cooperation in Virtual Organizations and Electronic Business Towards Smart Organizations, pp. 269-280, published: Norwell, MA, USA, 2001, xiv+532 pp. (Abstract Only).

(Continued)

Primary Examiner — Emerson C Puente
Assistant Examiner — Camquy Truong
(74) Attorney, Agent, or Firm — William A. Kinnaman, Jr.; Heslin Rothenberg Farley & Mesiti P.C.

(57) ABSTRACT

A resource broker is used in managing workloads of a peer-to-peer distributed computing environment. The broker is responsible for distributing to a plurality of clients of the peer-to-peer distributed computing environment tasks of one or more workloads of one or more issuers of the environment. The tasks are processed by the clients using a runtime environment provided by the broker. The runtime environment of a client is generic to the one or more issuers and independent of an operating system of the client.

35 Claims, 5 Drawing Sheets

U.S. PATENT DOCUMENTS

| | | | | |
|---|---|---|---|---|
| 6,078,906 | A | | 6/2000 | Huberman ....................... 705/37 |
| 6,098,091 | A | * | 8/2000 | Kisor ............................ 709/202 |
| 6,115,693 | A | | 9/2000 | McDonough et al. ........... 705/10 |
| 6,141,759 | A | * | 10/2000 | Braddy ........................ 713/201 |
| 6,192,405 | B1 | | 2/2001 | Bunnell ........................ 709/225 |
| 6,233,566 | B1 | | 5/2001 | Levine et al. .................... 705/37 |
| 6,247,056 | B1 | | 6/2001 | Chou et al. ..................... 709/229 |
| 6,370,560 | B1 | * | 4/2002 | Robertazzi et al. ............. 718/105 |
| 6,446,070 | B1 | * | 9/2002 | Arnold et al. ......................... 1/1 |
| 6,601,061 | B1 | * | 7/2003 | Holt et al. .......................... 707/3 |
| 7,093,004 | B2 | * | 8/2006 | Bernardin et al. ............. 709/219 |
| 2001/0016868 | A1 | | 8/2001 | Nakamura et al. |
| 2001/0037311 | A1 | * | 11/2001 | McCoy et al. .................. 705/65 |
| 2002/0138546 | A1 | * | 9/2002 | Parsonnet et al. .............. 709/200 |
| 2003/0097296 | A1 | * | 5/2003 | Putt ................................. 705/11 |

FOREIGN PATENT DOCUMENTS

| | | |
|---|---|---|
| JP | 11015796 A | 1/1999 |
| WO | WO9813757 A1 | 4/1998 |

OTHER PUBLICATIONS

"Metabroker: a generic broker for electronic commerce." Caughey S.; Ingham D; Watson P; Computer Networks and ISDN Systems, vol. 30, No. 1-7, pp. 619-620, Apr. 1998 (Abstract Only).

"Dynamic resource brokering for multi-user query execution", SIGMOD Record, vol. 24, No. 2, pp. 281-292, Jun. 1995 (Abstract Only).

* cited by examiner

EMPLOYING A RESOURCE BROKER IN MANAGING WORKLOADS OF A PEER-TO-PEER COMPUTING ENVIRONMENT

TECHNICAL FIELD

This invention relates, in general, to a peer-to-peer distributed computing environment, and in particular, to employing a resource broker in managing workloads of the peer-to-peer distributed computing environment.

BACKGROUND OF THE INVENTION

In one embodiment of a peer-to-peer distributed computing environment, one or more issuers have a direct relationship with one or more client resource providers. In such an environment, an issuer, desiring to have a workload processed, partitions the workload into a plurality of tasks, and delegates the tasks to the one or more client resource providers. The client resource providers accept the tasks and process them using local resources. The providers then send back the results of the tasks to the issuer.

In this environment, in order for a client resource provider to process a task, the client needs to contact the issuer to download and install a runtime environment to be used in processing the task. The runtime environment is specific to the issuer, and thus, if the issuer changes, so does the runtime environment. Further, if the client resource provider wishes to support multiple issuers, then multiple runtime environments need to be downloaded and installed on the client.

Based on the foregoing, a need exists for a peer-to-peer distributed computing environment that facilitates the processing of workloads by clients. For example, a need exists for an environment in which changes of the issuer do not affect the runtime environment. Further, a need exists for an environment in which a direct relationship is not necessary between the issuers and clients. Yet further, a need exists for an environment that supports multiple issuers without downloading and installing multiple runtime environments.

SUMMARY OF THE INVENTION

The shortcomings of the prior art are overcome and additional advantages are provided through the provision of a method of managing workloads of a peer-to-peer distributed computing environment. The method includes, for instance, distributing, by a broker executing on a communications unit of the peer-to-peer distributed computing environment to a plurality of clients of the peer-to-peer distributed computing environment, a plurality of tasks of a workload of an issuer of the peer-to-peer distributed computing environment, installing a runtime environment at a client of the plurality of clients, determining by the client one or more tasks of the plurality of tasks to be processed by that client based on a monetary rate of return to the client for processing, and processing the one or more tasks by the client, each of the plurality of clients comprising a processor, the client using the runtime environment for the processing, the runtime environment being generic to the issuer and independent of an operating system of the client. The method further comprises capping by the runtime environment use of one or more resources by the client in processing the one or more tasks.

Further, a method of facilitating management of workloads of a peer-to-peer distributed computing environment is provided. The method includes, for instance, managing via a resource broker executing on a communications unit one or more workloads of one or more issuers of the peer-to-peer distributed computing environment, the peer-to-peer distributed computing environment comprising a plurality of clients to process at least one workload of the one or more workloads. The method further comprises providing to a client of the plurality of clients a runtime environment for processing one or more tasks of the plurality of tasks, the runtime environment being generic to the one or more issuers and independent of an operating system of the client and the runtime environment capping use of one or more resources by the client in the processing, and determining by the client the one or more tasks of the plurality of tasks to be processed by that client based on a monetary rate of return to the client for processing, the client comprising a processor.

Yet further, a method of facilitating processing of workloads of a peer-to-peer distributed computing environment is provided. The method includes, for instance, installing a runtime environment at a client of a plurality of clients of a peer-to-peer distributed computing environment, receiving by the client one or more tasks of a workload of an issuer of the peer-to-peer distributed computing environment, the client comprising a processor. The method further comprises determining by the client at least one of the one or more tasks to process based on a monetary rate of return to the client for the processing, and processing by the client the at least one of the one or more tasks, wherein the client uses the runtime environment in processing, the runtime environment being generic to the issuer and independent of an operating system of the client, and the processing being performed with one or more resources that are capped by the runtime environment.

System and computer program products corresponding to the above-summarized methods are also described herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a resource broker (e.g., a grid computing resource broker) is used in managing workloads of a peer-to-peer distributed computing environment. The broker is provided as a layer between issuers and clients of the environment, and is responsible for receiving workloads from the issuers and having those workloads processed by the clients. The use of the resource broker enables the clients to process the workloads using a common or generic runtime environment.

Figure 1:
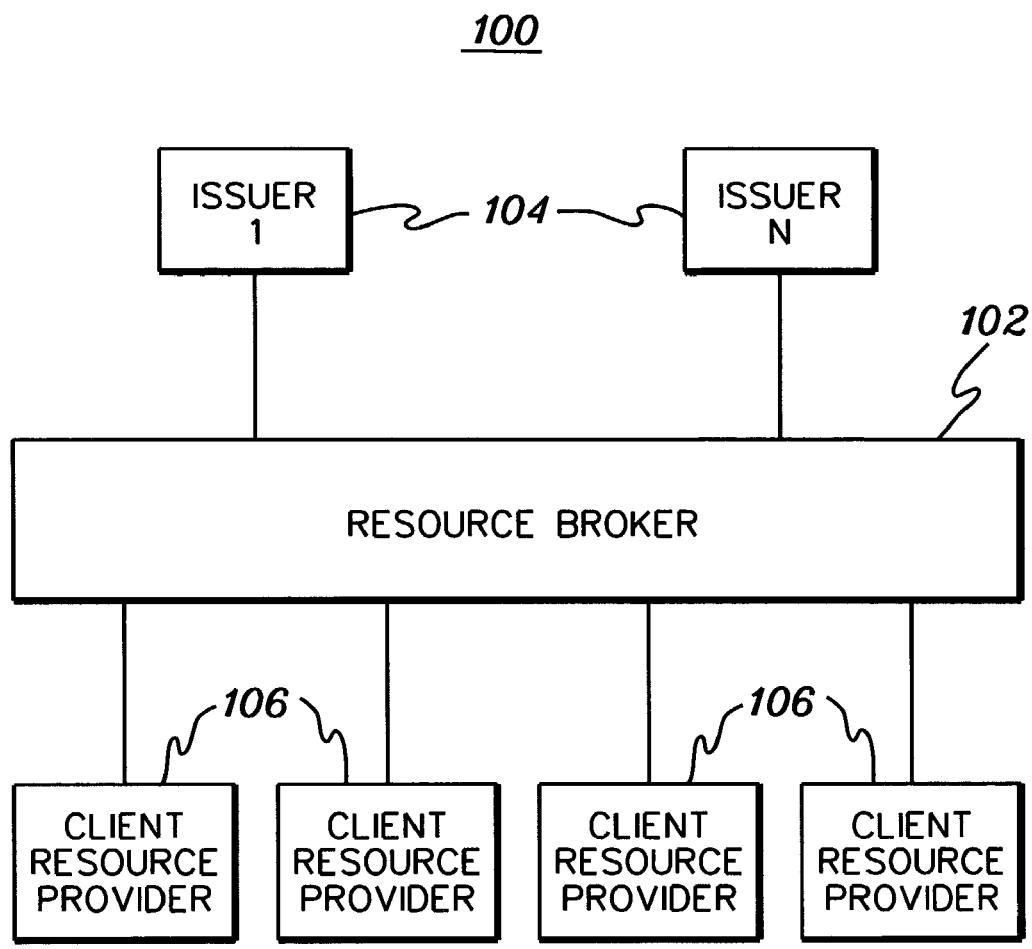
FIG. 1 depicts one example of a peer-to-peer distributed computing environment incorporating and using one or more aspects of the present invention.

One embodiment of a peer-to-peer distributed computing environment incorporating and using one or more aspects of the present invention is described with reference to FIG. 1. In one example, a peer-to-peer distributed computing environment 100 includes a resource broker 102 coupled to one or more issuers 104 and to one or more client resource providers 106 via, for instance, Internet Protocol (IP) network communications (e.g., HTTP). Resource broker 102 enables the one or more issuers to be coupled to the one or more client resource providers via an indirect relationship. That is, no direct relationship needs to exist between an issuer and a client.

In one example, the resource broker provides the infrastructure to receive workloads from one or more issuers, to distribute the workloads to one or more client providers, to track the workloads, and to perform accounting associated with the workloads, etc. The broker executes on a communications unit, such as, for example, a Power PC, a UNIX based mainframe, or a mainframe, to name just a few examples.

An issuer is, for instance, an application executing on a communications unit, such as, for example, an Intel or RISC based server. The application is typically, but not necessarily, computational intensive, and thus, desirous of executing within a peer-to-peer distributed environment. As examples, an issuer includes SETI, which is a search for extraterrestrial intelligence; or Folding@home, a protein folding application for drug research; or numerous other applications.

The issuer partitions its workload into one or more tasks to be processed. As examples, for business applications, a workload can be partitioned on a transaction basis, and for scientific applications, a workload can be partitioned by splitting up the computing range. In one embodiment, a task is a unit of work that uses one or more resources (e.g., CPU, main memory, non-volatile memory, I/O bandwidth) during processing. Tasks from one issuer can be normalized, such that they use the same amount of resources, or they can be undetermined, such that they use differing amounts of resources. The tasks are processed by one or more client resource providers.

A client resource provider is, for instance, a communications unit, such as, for example, a game station, a cell phone, an Intel personal computer, a server (e.g., an RS/6000), a mainframe or a Personal Digital Assistant (PDA). The providers use their own local resources to process the tasks, and are capable of processing tasks of one or more workloads of one or more issuers.

In one example, each client is isolated from one another and from the issuers. Further, each issuer is isolated from one another. Additionally, the clients may be homogeneous or at least two of the clients of the distributed environment may be heterogeneous to one another. For instance, at least two clients may have different architectures, different operating systems, and/or are different kinds of units (e.g., PDA, cell phone, personal computer, server, mainframe, etc.).

Figure 2:
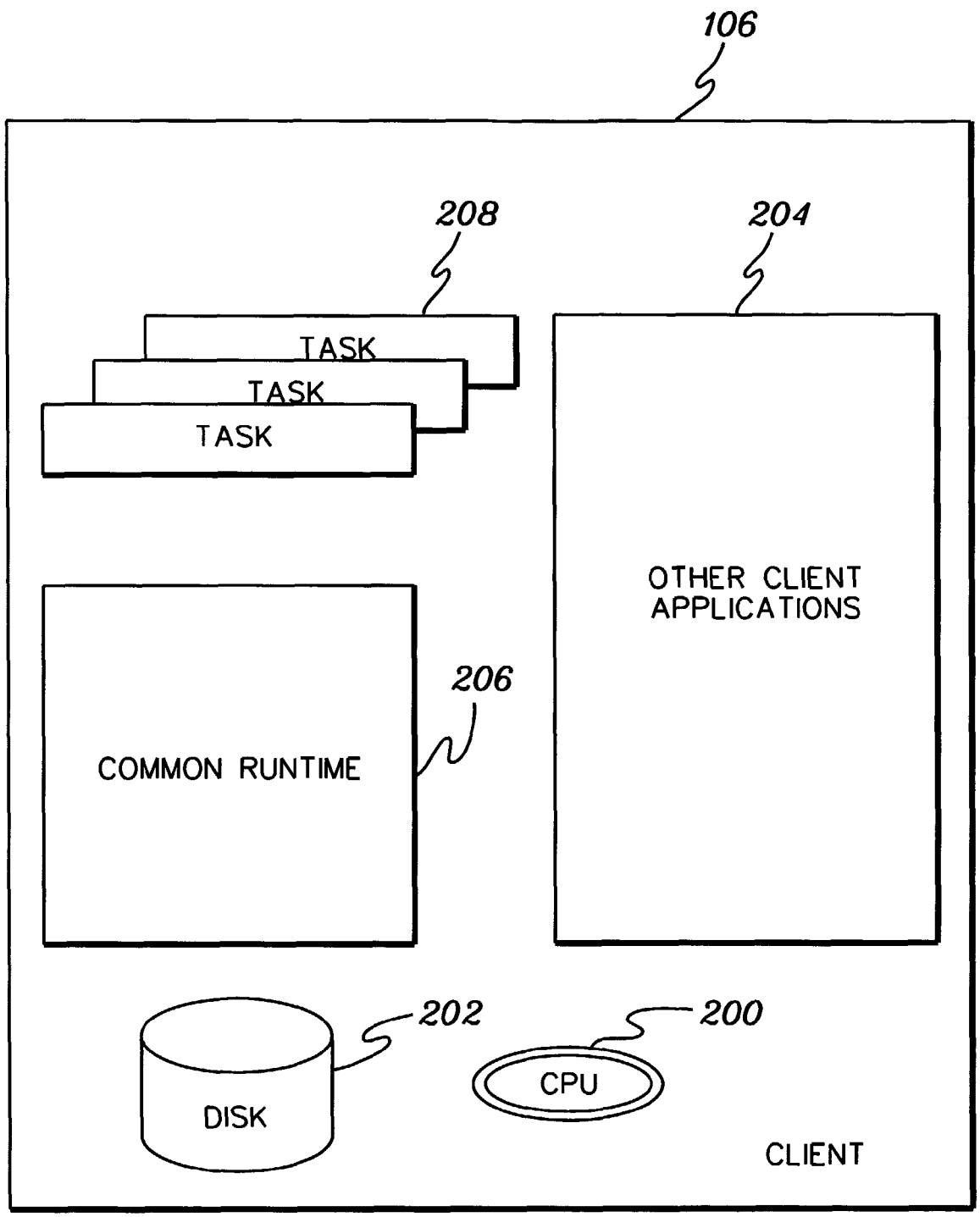
FIG. 2 depicts one example of further details of a client resource provider of FIG. 1, in accordance with an aspect of the present invention.

Further details regarding a client resource provider are described with reference to FIG. 2. In one example, a client resource provider 106 includes a central processing unit 200 executing an operating system, a disk storage 202, and one or more client applications 204. Additionally, in accordance with an aspect of the present invention, client 106 includes a common (or generic) runtime environment 206 used in processing one or more tasks 208 of one or more workloads. The common runtime environment co-exists with and is independent of the general purpose operating system of the CPU.

As described in further detail below, in one example, common runtime environment 206 is a constrained and isolated environment, which is defined by a user of the client. The user configures the environment by indicating which and how many resources of the client can be acquired by the common runtime environment and by the one or more tasks executing in the common runtime environment. The resources set aside for the common runtime environment are isolated from other applications and resources of the client.

The common runtime environment is a generic environment usable in processing tasks for multiple and diverse issuers. The runtime environment is, for example, a Java Virtual Machine or an operating system of a virtual machine that is generic to the issuers. The runtime environment is independent of the issuers and the clients. If an issuer changes, there is no effect on the runtime environment. Thus, the generic runtime environment need not be reinstalled for different issuers. Further, the runtime environment need not be reinstalled each time a task or a different workload is to be performed.

In one embodiment, the common runtime environment is provided to the clients by the resource broker. This processing, as well as other processing associated with the resource broker and a client provider, are described with reference to FIGS. 3a, 3b and 4.

Figure 3A:
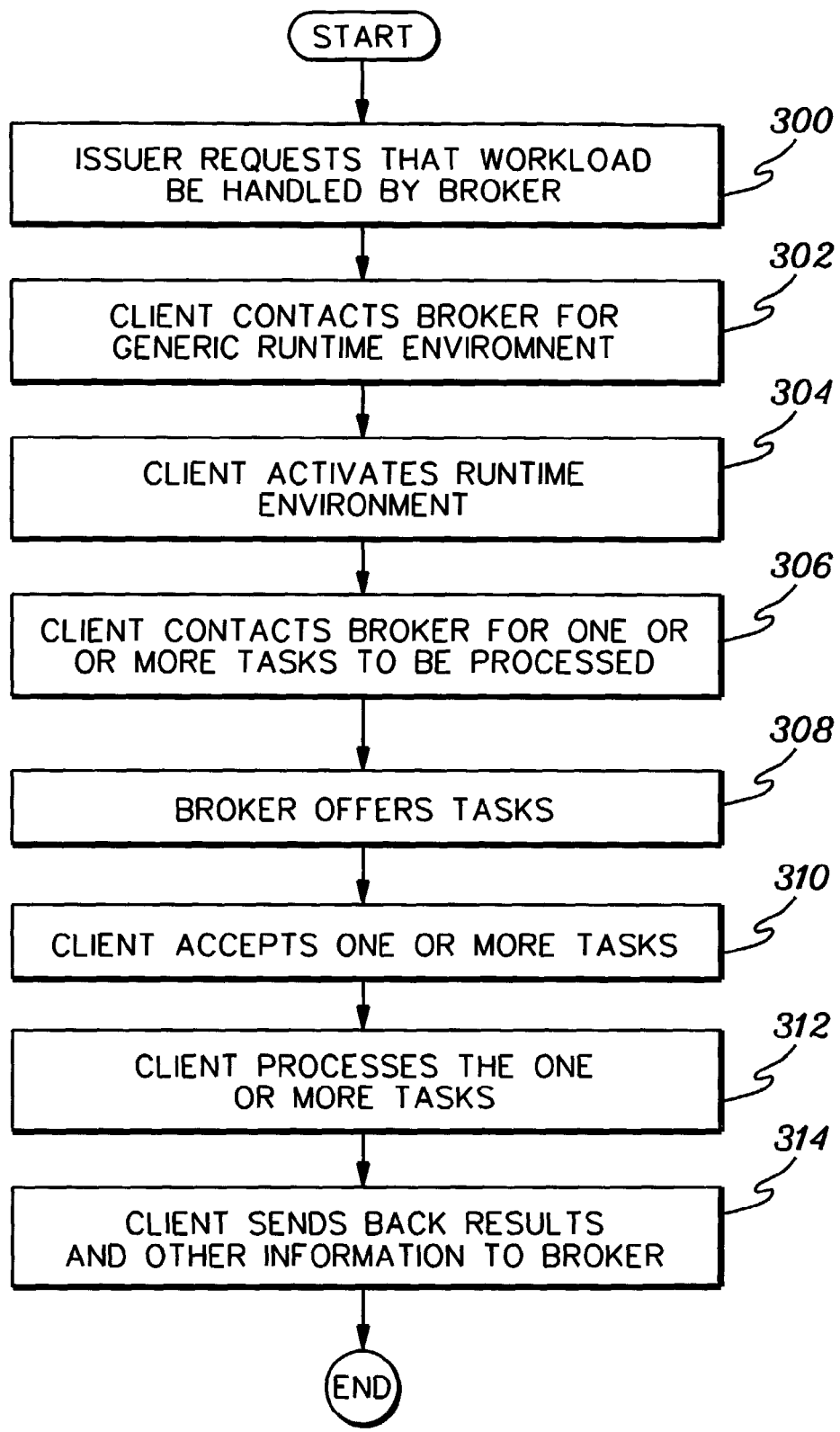
FIGS. 3a-3b depict one embodiment of the logic associated with using a resource broker to process workloads of one or more issuers of a peer-to-peer distributed computing environment, in accordance with an aspect of the present invention.
Figure 3B:
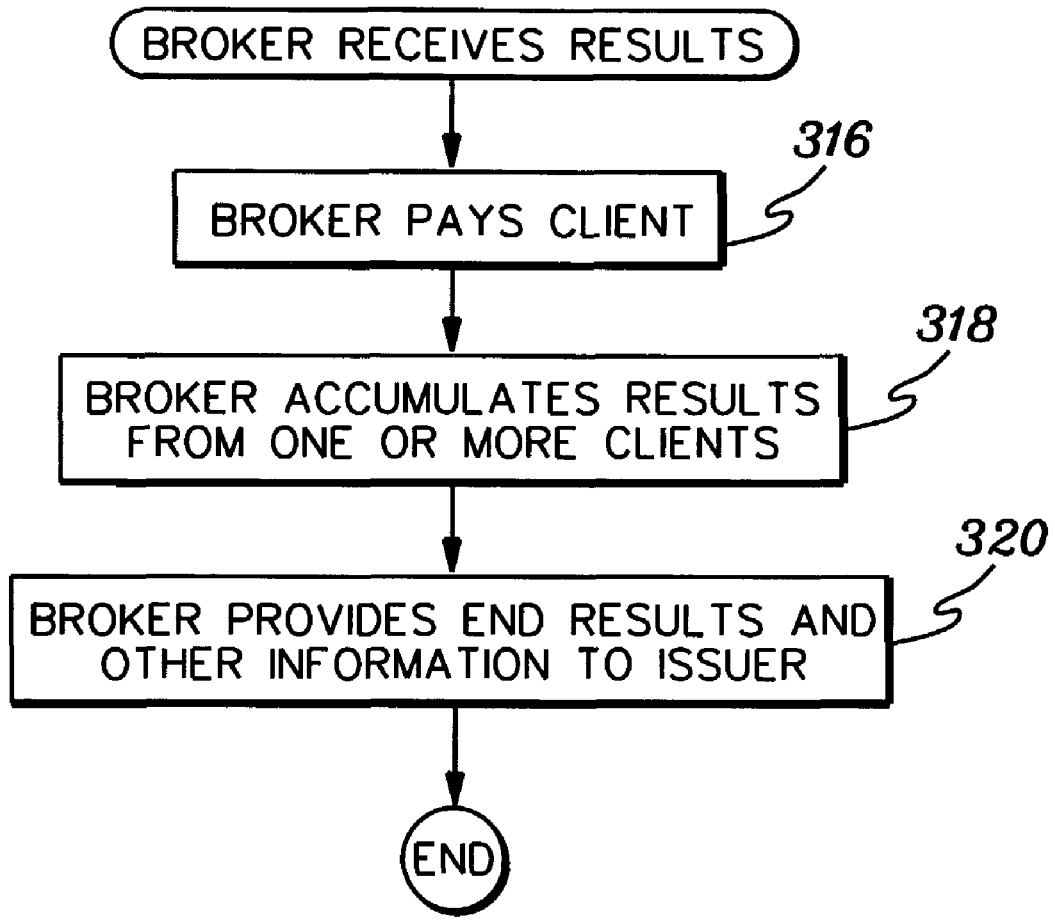

One embodiment of the logic associated with utilizing a resource broker to manage the processing of workloads of a peer-to-peer distributed computing environment is described with reference to FIGS. 3a-3b. Initially, an issuer requests that a workload of the issuer be handled by the resource broker, STEP 300 (FIG. 3a). The issuer requests that the broker handle the workload, and, in one embodiment, the issuer agrees on payment for the work to be handled by the broker.

A client interested in performing work for one or more issuers contacts the broker and requests that the runtime environment be downloaded from the broker to the client, STEP 302. The client installs and activates the generic runtime environment, STEP 304. In one embodiment, the steps of requesting, installing and activating the runtime environment on a particular client are performed once, unless an error occurs or the client is to be re-initialized. These steps need not be repeated for multiple issuers or multiple workloads. Further, these steps can be performed at various stages in the processing.

At a desirous time, the client (i.e., the runtime environment of the client) contacts the broker for one or more tasks to be processed, STEP 306. The client specifies (at this time, previously, or another time) the amount of resources it is willing to use to process tasks, and the resource broker determines, based on this information and/or other information (e.g., learned information from previous processing), which, if any, tasks should be offered to the client.

Assuming there are one or more tasks to be offered, the broker offers to the client one or more tasks, STEP 308. The tasks can be for one or more workloads of one or more issuers. In one example, the broker offers different tasks for one or more workloads at different rates (e.g., monetary rates). Thus, the client decides which tasks fit its profile and/or offers the client the best rate of return. For example, if a particular client is CPU intensive, but has less memory, then the client looks to those tasks that need more CPU but less memory. Further, the client decides which of those tasks has a better rate of return.

Subsequent to making the analysis, the client accepts one or more tasks for processing, STEP 310. In one embodiment, the tasks and any associated data objects are encrypted (e.g., using Secure Socket Layer (SSL)) by the broker and then forwarded to the client. The client runtime environment decrypts the tasks and data, and processes the one or more tasks using, for instance, local resources of the client, STEP 312. Additional details of this processing is described further below with reference to FIG. 4.

During processing, the runtime environment tracks the amount of resources consumed by the client to perform the one or more tasks. In one example, it tracks the particular resources consumed by each task.

Upon completion of processing the one or more tasks, the client sends back to the resource broker the results of the processing, as well as information about resource consumption, STEP 314. Based on this information, the broker pays the client for each completed task, STEP 316 (FIG. 3b). The payment is based, for example, on the resources consumed, as well as on the agreed rate.

The broker accumulates the results for a workload from one or more client providers, STEP 318. The broker is responsible for tracking which tasks have been distributed to which client and which tasks have been completed. When the broker receives the results for all of the tasks of a workload, the broker determines one or more end results. Eventually, the broker provides the one or more end results to the issuer, and the issuer pays the broker, STEP 320.

In one embodiment, the broker keeps track of which clients, from a historic perspective, have worked on which tasks and for how long. At any given time, the broker knows how much of the workload has been processed. It also has, in one embodiment, a timeout mechanism, such that a task distributed to the client timeouts if it has not been processed or has been processing for a selected period of time.

With the above logic, the broker can service one or more issuers at any one time. Further, one or more clients can receive and activate the runtime environment and process tasks using that runtime environment. In one example, a client provider continues to request tasks from the broker and process those tasks, until the client deactivates the runtime environment.

Figure 4:
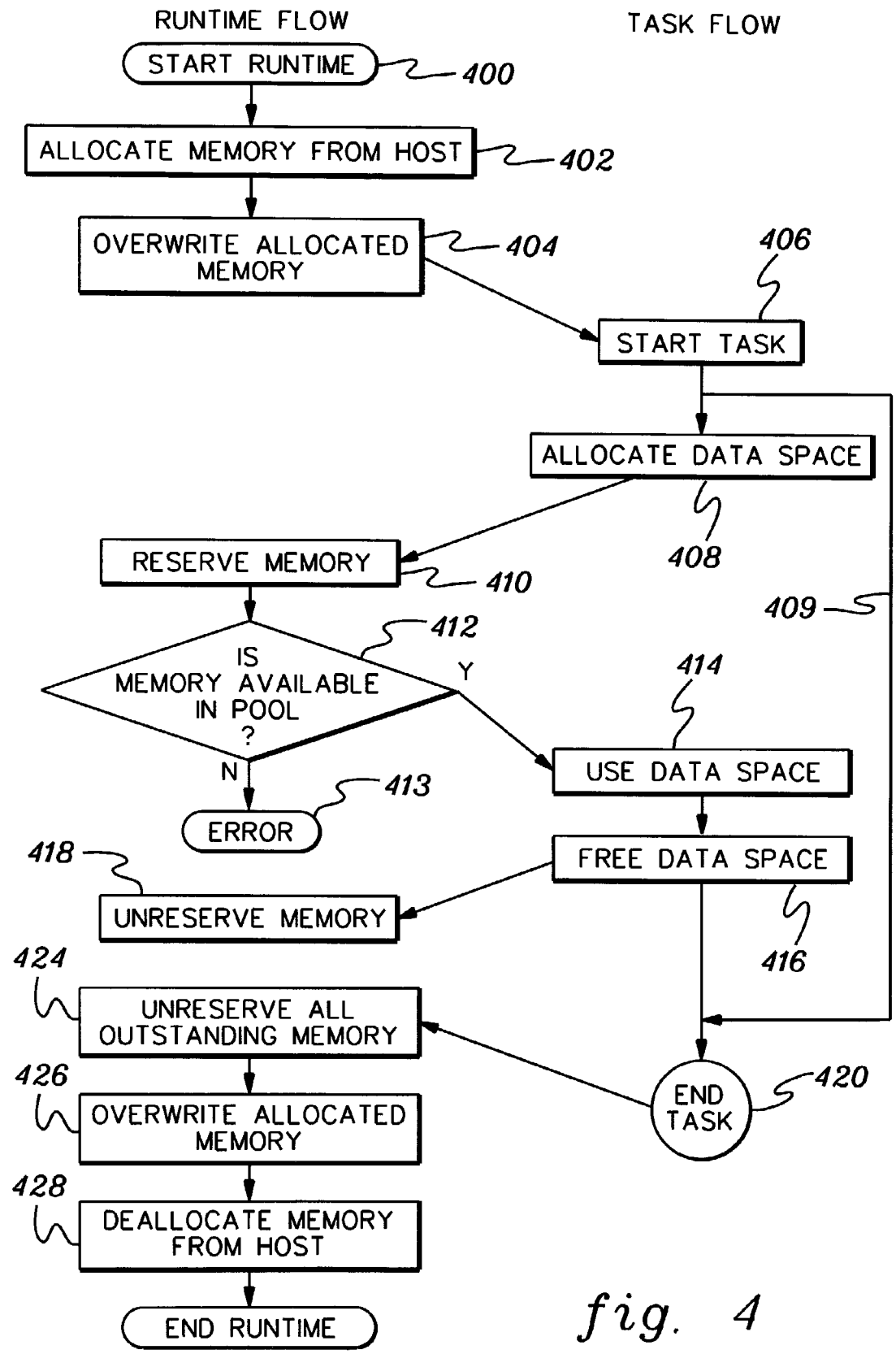
FIG. 4 depicts one embodiment of the logic associated with a runtime flow and a task flow, in accordance with an aspect of the present invention.

Further details associated with the use of the runtime environment in processing one or more tasks is described with reference to FIG. 4. In particular, FIG. 4 depicts two logic flows: one occurring in the runtime environment, and another associated with a task being processed. In one example, the common runtime environment has the ability to control the amount of resources used for a particular task, based on user input of the client activating the runtime environment. To demonstrate this ability, an example is described herein in which memory is being controlled. The common runtime environment implements its own memory management subsystem for the task and caps the amount of memory resource utilized by the task.

Initially, the runtime environment is started on the client, STEP 400, and during an initialization phase, the runtime environment allocates a predefined amount of memory of the client usable by the runtime environment, STEP 402. Thus, the runtime environment is limited to using the allocated amount of memory. No additional memory is allocated to the runtime environment. Further, this allocated memory is not available to any other applications on the client, thus, providing isolation, privacy and security of the data in the memory.

Subsequent to allocating the memory, the memory is cleared (e.g., overwritten with zeros), STEP 404. This provides isolation for one or more tasks that are to use the allocated memory. Additionally, a task is started, STEP 406, and the task allocates one or more objects in memory, STEP 408. In one example, in order to accomplish the allocation, the task contacts the runtime environment, which provides the allocation function for the task. Since the memory accessed by the task is controlled by the runtime environment, it is guaranteed to have isolation and protection. (In a further embodiment, if a data space is not needed, then it is not allocated, but the computation is performed (see reference numeral 409).)

The runtime environment attempts to reserve the desired amount of the allocated memory pool, STEP 410. If an insufficient amount of memory is available, INQUIRY 412, then an error condition is encountered, STEP 413. In response to encountering the error condition, various steps can be taken. For instance, the task can terminate, and/or an error handling condition can be employed.

However, if memory is available in the pool, then the reserved amount of memory (i.e., data space) is usable by the task, STEP 414. The task performs one or more functions (e.g., computations) using the data space. After use of the data space is complete, the data space is freed, STEP 416. In one embodiment, this includes unreserving the memory by the runtime environment, STEP 418. Further, the task ends, STEP 420.

Any outstanding memory is then un-reserved, STEP 424, and the memory is cleared, STEP 426. Additionally, the memory is deallocated, STEP 426.

In the above example, resource capping is achieved by the fact that the runtime environment only allocates as much memory as configured by the end user. Thus, the task thereafter can only allocate memory out of the pool that was originally acquired by the runtime environment. Isolation, in this example, is achieved by the fact that the memory is cleared before and after the tasks use the memory. Also, during the duration of the task, memory is owned by the runtime environment, and the client does not allow other applications running on the client to access the memory in use by the common runtime environment. Since the common runtime environment implements its own memory management, the tasks cannot access memory other than that allocated by the common runtime environment.

In other embodiments, other types of resources can be capped. For example, CPU utilization can also be capped by again indicating at the common runtime environment the amount of CPU utilization to be used by each task. Other resources, such as I/O bandwidth, can also be constrained. As one example, further details regarding capping are provided through a product offered by International Business Machines Corporation referred to as the Intelligent Resource Director on z/OS and references associated therewith.

Described in detail above is the use of a resource broker in managing the processing of workloads in a peer-to-peer distributed computing environment. The resource broker provides a common runtime environment to the clients that are to process tasks of the workloads. Advantageously, issuers do not need to build a relationship with the clients. The issuers obtain results faster by working with the established broker, instead of building one or more client communities. Client resources can be deployed for multiple issuers without changing the runtime environment, and the client runtime environment determines the best rate of return for issuer tasks. Integrity, security and privacy of tasks are protected.

Advantageously, one or more aspects of the present invention standardize the runtime environment, which provides flexibility (e.g., multiple tasks without reinstall), privacy and integrity of tasks, and security (e.g., client is secure from malicious task attacks). It also provides common metrics between issuers that can be used for standardized charging of resource consumption.

The embodiments described above are only examples. For instance, although examples of communications units are provided for issuers, clients and the broker, one or more aspects of the invention are not limited to such examples. Other communications units, as well as other units, are also possible. Further, one or more communications units can be included on one or more nodes of the environment.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing workloads of a peer-to-peer distributed computing environment, said method comprising:
   distributing, by a broker executing on a communications unit of the peer-to-peer distributed computing environment to a plurality of clients of the peer-to-peer distributed computing environment, a plurality of tasks of a workload of an issuer of the peer-to-peer distributed computing environment;
   installing a runtime environment at a client of the plurality of clients;
   determining by the client one or more tasks of the plurality of tasks to be processed by that client based on a monetary rate of return to the client for processing;
   processing the one or more tasks by the client based on the determining, each of the plurality of clients comprising a processor, and wherein the client uses the runtime environment for the processing, said runtime environment being generic to the issuer and independent of an operating system of the client; and
   capping by the runtime environment use of one or more resources by the client in processing the one or more tasks, wherein the one or more tasks contact the runtime environment to use the one or more resources.

2. The method of claim 1, further comprising providing by the issuer to the broker the workload to be distributed.

3. The method of claim 1, wherein the issuer is isolated from the plurality of clients.

4. The method of claim 1, wherein the runtime environment of the client provides isolation from other portions of the client.

5. The method of claim 1, wherein the runtime environment implements a memory management subsystem, and wherein the one or more resources comprises a portion of the memory allotted to the one or more tasks by the runtime environment.

6. The method of claim 1, wherein the issuer is coupled to the plurality of clients via the broker, thereby providing an indirect relationship between the issuer and the plurality of clients.

7. The method of claim 1, further comprising forwarding by one or more clients of the plurality of clients results of the processing to the broker.

8. The method of claim 7, further comprising:
   accumulating the results by the broker; and
   providing to the issuer one or more end results based on the accumulating.

9. The method of claim 1, further comprising providing by the broker monetary payment to at least one client of the plurality of clients for the processing.

10. The method of claim 1, further comprising tracking by the broker which tasks of the plurality of tasks are being processed by which clients of the plurality of clients.

11. The method of claim 1, further comprising providing monetary payment to the broker from the issuer.

12. A method of facilitating management of workloads of a peer-to-peer distributed computing environment, said method comprising:
   managing via a resource broker executing on a communications unit one or more workloads of one or more issuers of the peer-to-peer distributed computing environment, said peer-to-peer distributed computing environment comprising a plurality of clients to process at least one workload of the one or more workloads;
   providing to a client of the plurality of clients a runtime environment for processing one or more tasks of the plurality of tasks, the runtime environment being generic to the one or more issuers and independent of an operating system of the client and the runtime environment capping use of one or more resources by the client in the processing, wherein the one or more tasks contact the runtime environment to use the one or more resources;
   installing the runtime environment at the client; and
   determining by the client the one or more tasks of the plurality of tasks to be processed by that client based on a monetary rate of return to the client for processing, wherein the client comprises a processor.

13. The method of claim 12, wherein the runtime environment implements a memory management subsystem, and wherein the one or more resources comprises a portion of the memory allotted to the one or more tasks by the runtime environment.

14. The method of claim 12, wherein the managing comprises tracking a workload of the one or more workloads.

15. The method of claim 12, wherein the managing comprises providing one or more accounting services relating to a workload of the one or more workloads.

16. The method of claim 12, wherein the managing comprises distributing one or more tasks of the at least one workload to one or more clients of the plurality of clients.

17. A method of facilitating processing of workloads of a peer-to-peer distributed computing environment, said method comprising:
   installing a runtime environment at a client of a plurality of clients of a peer-to-peer distributed computing environment;

receiving by the client one or more tasks of a workload of an issuer of the peer-to-peer distributed computing environment, via a resource broker executing on a communications unit, wherein the client comprises a processor;

determining by the client at least one of the one or more tasks to process based on a monetary rate of return to the client for processing; and processing by the client the at least one of the one or more tasks, wherein the client uses the runtime environment in processing, said runtime environment being generic to the issuer and independent of an operating system of the client, wherein the processing is performed with one or more resources that are capped by the runtime environment, and wherein the at least one of the one or more tasks contacts the runtime environment to use the one or more resources.

18. A system of managing workloads of a peer-to-peer distributed computing environment, said system comprising:

a broker executing on a communications unit of the peer-to-peer distributed computing environment to distribute to a plurality of clients of the peer-to-peer distributed computing environment a plurality of tasks of a workload of an issuer of the peer-to-peer distributed computing environment; and the plurality of clients to process the plurality of tasks, each of the plurality of clients comprising a processor, and wherein at least one of the plurality of clients is configured to determine which task to process from among those received thereby, wherein a client of the plurality of clients installs and uses a runtime environment for the processing, said runtime environment being generic to the issuer and independent of an operating system of the client based on a monetary rate of return to the client for processing, and wherein the runtime environment caps use by the client of one or more resources in the processing of the determined task, and wherein the determined task contacts the runtime environment to use the one or more resources.

19. The system of claim 18, wherein the runtime environment of the client provides isolation from other portions of the client.

20. The system of claim 18, wherein the runtime environment implements a memory management subsystem, and wherein the one or more resources comprises a portion of the memory allotted to the one or more tasks by the runtime environment.

21. The system of claim 18, wherein the issuer is coupled to the plurality of clients via the broker, thereby providing an indirect relationship between the issuer and the plurality of clients.

22. The system of claim 18, wherein one or more clients of the plurality of clients are adapted to forward results of the processing to the broker.

23. The system of claim 22, wherein the broker is adapted to accumulate the results and provide to the issuer one or more end results based on the accumulating.

24. The system of claim 18, wherein the broker is further adapted to track which tasks of the plurality of tasks are being processed by which clients of the plurality of clients.

25. A system of facilitating management of workloads of a peer-to-peer distributed computing environment, said system comprising:

a resource broker executing on a communications unit to manage one or more workloads of one or more issuers of the peer-to-peer distributed computing environment, said peer-to-peer distributed computing environment comprising a plurality of clients, each of the plurality of clients comprising a processor, for processing at least one workload of the one or more workloads in a runtime environment installed at a client for the processing, wherein the runtime environment being generic to the one or more issuers and independent of an operating system of the client, wherein at least one of the plurality of clients is configured to determine which task to process from among those received thereby based on a monetary rate of return to the client for processing, wherein the runtime environment caps use of one or more resources by the client in the processing, and wherein the determined task contacts the runtime environment to use the one or more resources.

26. The system of claim 25, wherein the runtime environment implements a memory management subsystem, and wherein the one or more resources comprises a portion of the memory allotted to the one or more tasks by the runtime environment.

27. A computer program product for facilitating management of workloads of a peer-to-peer distributed computing environment, the computer program product comprising:

a program storage device readable by a communications unit and storing instructions for execution by the communications unit for performing a method comprising:

distributing, by a broker of the peer-to-peer distributed computing environment to a plurality of clients of the peer-to-peer distributed computing environment, a plurality of tasks of a workload of an issuer of the peer-to-peer distributed computing environment;

installing a runtime environment at a client of the plurality of clients;

determining by the client one or more tasks of the plurality of tasks to be processed by that client based on a monetary rate of return to the client for processing;

processing the one or more tasks by the client, wherein the client uses the runtime environment for the processing, said runtime environment being generic to the issuer and independent of an operating system of the client; and capping by the runtime environment use of one or more resources by the client in processing the one or more tasks, wherein the one or more tasks contact the runtime environment to use the one or more resources.

28. The computer program product of claim 27, wherein the runtime environment of the client provides isolation from other portions of the client.

29. The computer program product of claim 27, wherein the runtime environment implements a memory management subsystem, and wherein the one or more resources comprises a portion of the memory allotted to the one or more tasks by the runtime environment.

30. The computer program product of claim 27, wherein the issuer is coupled to the plurality of clients via the broker, thereby providing an indirect relationship between the issuer and the plurality of clients.

31. The computer program product of claim 27, wherein said method further comprises forwarding by one or more clients of the plurality of clients results of the processing to the broker.

32. The computer program product of claim 31, wherein said method further comprises:

accumulating the results by the broker; and providing to the issuer one or more end results based on the accumulating.

33. The computer program product of claim 27, wherein said method further comprises tracking by the broker which tasks of the plurality of tasks are being processed by which clients of the plurality of clients.

34. A computer program product for facilitating management of workloads of a peer-to-peer distributed computing environment, the computer program product comprising:

a program storage device readable by a communications unit and storing instructions for execution by the communications unit for performing a method comprising:

managing via a resource broker one or more workloads of one or more issuers of the peer-to-peer distributed computing environment, said peer-to-peer distributed computing environment comprising a plurality of clients to process at least one workload of the one or more workloads;

providing to a client of the plurality of clients a runtime environment for processing one or more tasks of the plurality of tasks, the runtime environment being generic to the one or more issuers and independent of an operating system of the client and the runtime environment capping use of one or more resources by the client in the processing, wherein the one or more tasks contact the runtime environment to use the one or more resources;

installing the runtime environment at the client; and determining by the client the one or more tasks of the plurality of tasks to be processed by that client based on a monetary rate of return to the client for processing.

35. The computer program product of claim 34, wherein one or more clients of the plurality of clients include a runtime environment, said runtime environment being generic to the one or more issuers.

* * * * *